(12) United States Patent
Chatterjee et al.

(10) Patent No.: US 10,067,682 B1
(45) Date of Patent: Sep. 4, 2018

(54) I/O ACCELERATOR FOR STRIPED DISK ARRAYS USING PARITY

(71) Applicant: American Megatrends, Inc., Norcross, GA (US)

(72) Inventors: Paresh Chatterjee, Fremont, CA (US); Srikumar Subramanian, Newark, CA (US); Raghavan Sowrirajan, Fremont, CA (US); Sankarji Gopalakrishnan, Fremont, CA (US)

(73) Assignee: American Megatrends, Inc., Norcross, GA (US)

( * ) Notice: Subject to any disclaimer, the term of this patent is extended or adjusted under 35 U.S.C. 154(b) by 75 days.

(21) Appl. No.: 15/185,522

(22) Filed: Jun. 17, 2016

Related U.S. Application Data

(63) Continuation of application No. 13/449,496, filed on Apr. 18, 2012, now Pat. No. 9,396,067.

(60) Provisional application No. 61/476,725, filed on Apr. 18, 2011.

(51) Int. Cl.
  *G06F 12/00* (2006.01)
  *G06F 3/06* (2006.01)
  *G06F 12/0866* (2016.01)

(52) U.S. Cl.
  CPC .......... *G06F 3/061* (2013.01); *G06F 3/0611* (2013.01); *G06F 3/0613* (2013.01); *G06F 3/0644* (2013.01); *G06F 3/0656* (2013.01); *G06F 3/0659* (2013.01); *G06F 3/0689* (2013.01); *G06F 12/0866* (2013.01)

(58) Field of Classification Search
  CPC ...... G06F 3/061; G06F 3/0644; G06F 3/0689; G06F 3/0656; G06F 3/0659; G06F 3/0611; G06F 3/0613; G06F 12/0866
  See application file for complete search history.

(56) References Cited

U.S. PATENT DOCUMENTS

| | | |
|---|---|---|
| 5,557,770 A | 9/1996 | Bhide et al. |
| 5,933,834 A | 8/1999 | Aichelen |
| 6,148,368 A | 11/2000 | Dekoning |

(Continued)

OTHER PUBLICATIONS

Rosenblum, M., et al., "The Design and Implementation of a Log-Structured File System," ACM Transactions on Computer Systems, vol. 10, No. 1, 1992, pp. 26-52.

(Continued)

*Primary Examiner* — Shawn X Gu
(74) *Attorney, Agent, or Firm* — Meunier Carlin & Curfman LLC

(57) ABSTRACT

Disclosed herein is an enhanced volume manager (VM) for a storage system that accelerates input/output (I/O) performance for random write operations to a striped disk array using parity. More specifically, various implementations are directed to accelerating "random writes" (writes comprising less than a complete stripe of data) by consolidating several random writes together to create a "sequential write" (a full-stripe write) to eliminate one or more read operations and/or increase the volume of new/updated data stored for each write operation. Several such implementations comprise functionality in the VM (volume manager) for identifying random write I/O requests, queuing them locally in a journal, and then periodically flushing the journal to the disk array as a sequential write request.

20 Claims, 8 Drawing Sheets

(56) References Cited

U.S. PATENT DOCUMENTS

| | | |
|---|---|---|
| 6,516,380 B2 | 2/2003 | Kenchammana-Hoskote et al. |
| 7,076,606 B2 | 7/2006 | Orsley |
| 7,606,944 B2 | 10/2009 | Kalwitz et al. |
| 7,853,751 B2 | 12/2010 | Manoj |
| 2003/0182502 A1 | 9/2003 | Kleiman et al. |
| 2003/0225970 A1 | 12/2003 | Hashemi |
| 2004/0128470 A1 | 7/2004 | Hetzler et al. |
| 2007/0283086 A1* | 12/2007 | Bates .................. G06F 3/0613 711/113 |
| 2009/0249018 A1 | 10/2009 | Nojima et al. |
| 2010/0211736 A1 | 8/2010 | Chen et al. |

OTHER PUBLICATIONS

Stodolsky, D., et al., "Parity Logging, Overcoming the Small Write Problem in Redundant Disk Arrays," 20$^{th}$ Annual International Symposium on Computer Architecture, San Diego, CA, May 16-19, 1993, 12 pages.

\* cited by examiner

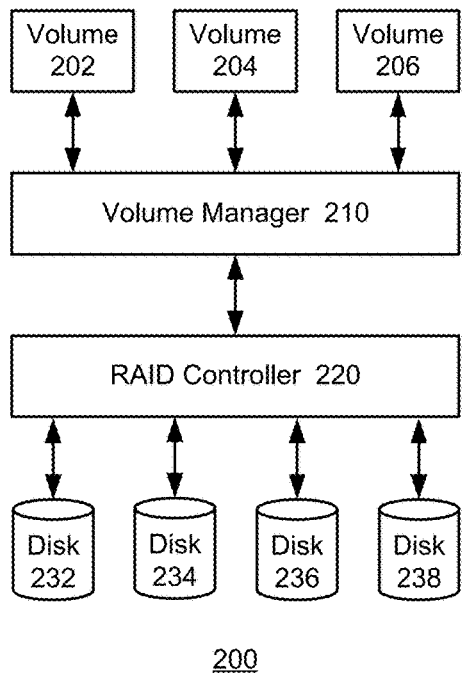
*FIG. 2A*
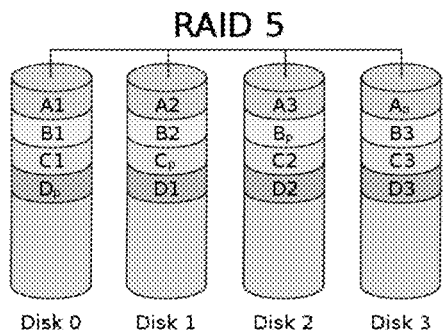
*FIG. 2B*
*FIG. 3A*
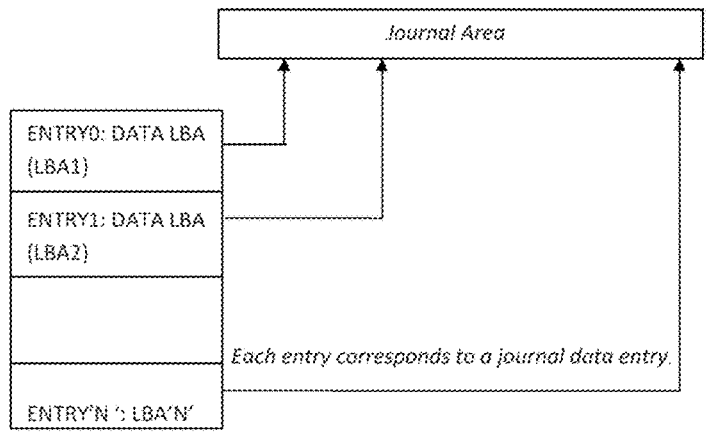

I/O ACCELERATOR FOR STRIPED DISK ARRAYS USING PARITY

CROSS-REFERENCE TO RELATED APPLICATION

This application is a continuation of U.S. patent application Ser. No. 13/449,496, filed on Apr. 18, 2012, now U.S. Pat. No. 9,396,067, entitled "I/O Accelerator for Striped Disk Arrays Using Parity," which claims the benefit of U.S. Provisional Patent Application No. 61/476,725, filed on Apr. 18, 2011, entitled "I/O Accelerator for Striped Disk Arrays Using Parity." The disclosures of which are all hereby incorporated by reference in their entireties.

BACKGROUND

A RAID-5 disk array uses block-level striping (where a stripe is a concurrent series of blocks, one block for each disk in the array) with parity data distributed across all member disks. Data is also written to each physical disk one block at a time. However, whenever a "random" block (or some portion thereof) is updated and needs to be written to the physical disk, the parity block (or some portion thereof) must also be recalculated and rewritten. Consequently, each random block-level write requires at least two reads and two writes to complete.

While this is particularly costly for small write operations (i.e., operations involving a single block), larger sequential writes that span the entire width of the stripe (i.e., a "full-stripe write"), are much less costly because no read operations are required; instead, the new full-stripe write data (including the new calculated parity block) can simply be written over the entire stripe (as four concurrent write operations) without regard for the old data that is no longer needed for any purpose.

SUMMARY

Various implementations disclosed herein are directed to an enhanced volume manager (VM) for a storage system that accelerates input/output (I/O) performance for random write operations to a striped disk array using parity. More specifically, various implementations are directed to accelerating "random writes" (writes comprising less than a complete stripe of data) by consolidating several random writes together to create a "sequential write" (a full-stripe write) to eliminate one or more read operations and/or increase the volume of new/updated data stored for each write operation. Several such implementations comprise functionality in the VM (volume manager) for identifying random write I/O requests, queuing them locally in a journal, and then periodically flushing the journal to the disk array as a sequential write request.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

To facilitate an understanding of and for the purpose of illustrating the present disclosure and various implementations, exemplary features and implementations are disclosed in, and are better understood when read in conjunction with, the accompanying drawings—it being understood, however, that the present disclosure is not limited to the specific methods, precise arrangements, and instrumentalities disclosed. Similar reference characters denote similar elements throughout the several views. In the drawings:

FIG. 2A is a block diagram illustrating a typical storage device exposing a plurality of volumes (or logical disks) managed by a volume manager (VM) and backed by a disk array comprising a RAID controller its associated plurality of physical disks;

FIG. 2B is a block diagram of an exemplary RAID-5 physical disk array for which the numerous implementations disclosed herein may be applied;

FIG. 3A is a block diagram of a journal comprising a journal table and journal data storage area, said journal representative of several implementations disclosed herein;

DETAILED DESCRIPTION

Figure 1:
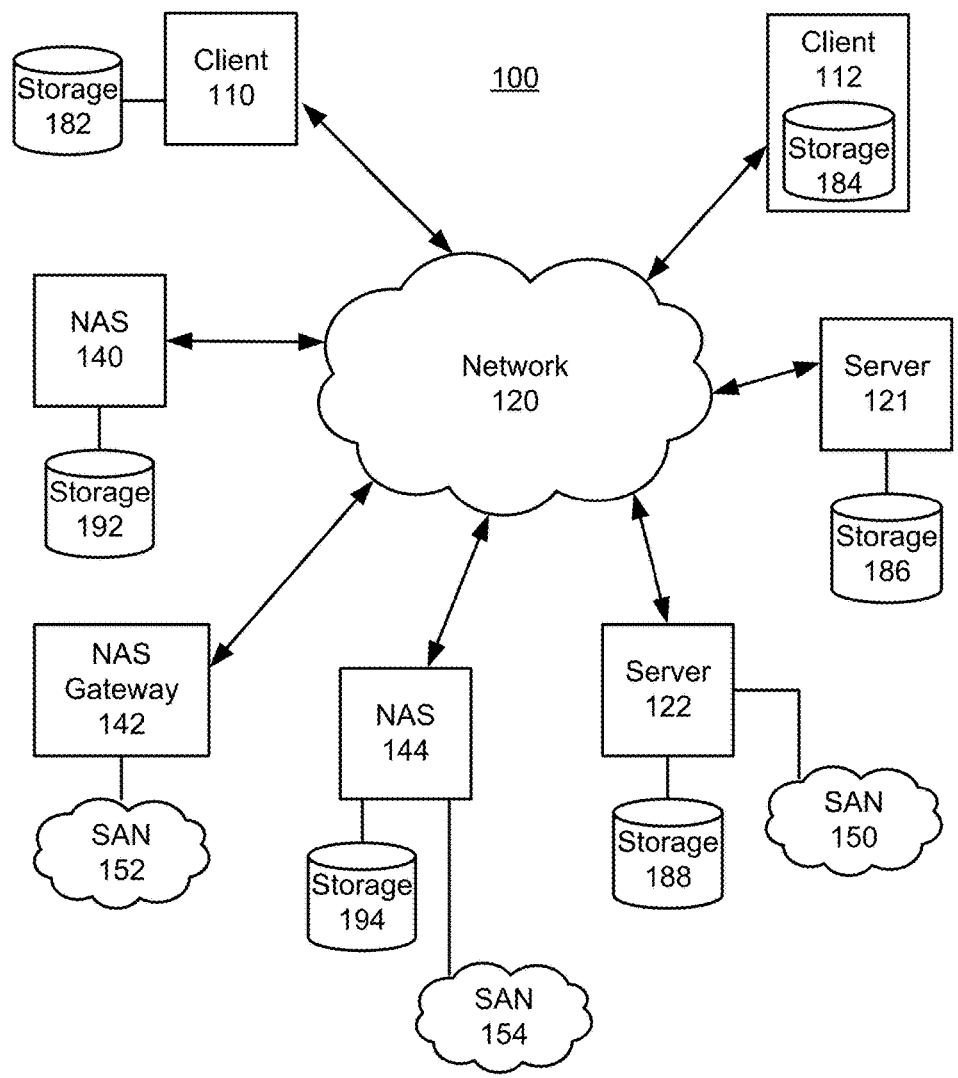
FIG. 1 is an illustration of an exemplary network environment in which the numerous implementations disclosed herein may be utilized.

A disk array is a disk storage system which contains multiple disk drives. A Redundant Array of Independent/Inexpensive Disks (or RAID) is the combination of multiple disk drive components into a single logical unit where data is distributed across the drives in one of several approaches (referred to as "RAID levels"). "RAID" has also become an umbrella term for computer data storage schemes that can divide and replicate data among multiple physical disk drives arranged in a "RAID array" addressed by the operating system as a single virtual disk comprising one or more volumes.

Many operating systems implement RAID in software as a layer that abstracts multiple physical storage devices to provide a single virtual device as a component of a file system or as a more generic logical volume manager (typical for server systems). Server system implementations typically provide volume management which allows a system to present logical volumes for use. As such, a volume is a single accessible storage area within a single file system that represents a single logical disk drive, and thus a volume is the logical interface used by an operating system to access data stored in a file system that can be distributed over multiple physical devices.

In storage systems such as RAID, a disk array controller (DAC) is used to manage the physical disk drives and present them as logical units or volumes to the computing system. When the physical disk drives comprise a RAID, the disk array controller can also be referred to as a RAID controller. The DAC provides both a back-end interface and a front-end interface. The back-end interface communicates with the controlled disks using a protocol such as, for example, ATA, SATA, SCSI, FC, or SAS. The front-end interface communicates with a computer system using one of the disk protocols such as, for example, ATA, SATA, SCSI, or FC (to transparently emulate a disk for the computer system) or specialized protocols such as FICON/ESCON, iSCSI, HyperSCSI, ATA over Ethernet, or Infini-Band. The DAC may use different protocols for back-end and front-end communication.

External disk arrays, such as a storage area network (SAN) or network-attached storage (NAS) servers, are physically independent enclosures of disk arrays. A storage area network (SAN) is a dedicated storage network that provides access to consolidated block-level storage, and is primarily are used to make storage devices (such as disk arrays) accessible to servers so that the devices appear as locally attached to those servers. A SAN typically comprises its own intra-network of storage devices that are generally not directly accessible by regular devices. A SAN alone does not provide the "file" abstraction, only block-level operations on virtual blocks of data; however, file systems built on top of SANs do provide this abstraction and are known as SAN file systems or shared disk file systems. Virtual blocks, or "block virtualization," are the abstraction (of separation) of logical storage from physical storage so that data may be accessed without regard to physical storage or heterogeneous structure and thereby allows the storage system greater flexibility in how its manage it physical storage.

Network-attached storage (NAS), on the other hand, is file-level computer data storage connected to a computer network providing data access to heterogeneous clients. NAS systems typically comprise one or more hard drives often arranged into logical redundant storage containers or RAID arrays. Network-attached storage (NAS), in contrast to SAN, does not attempt to appear as locally attached but, instead, uses several file-based sharing protocols such as NFS, SMB/CIFS, of AFP to enable remote computers to request a portion of an abstract file (rather than a disk block). As such, an NAS may comprise a SAN and/or a disk array, and an "NAS gateway" can be added to a SAN to effectively convert it into a NAS since NAS provides both storage and a file system whereas SAN provides only block-based storage and leaves file system concerns to the client. NAS can also be used to refer to the enclosure containing one or more disk drives (which may be configured as a RAID array) along with the equipment necessary to make the storage available over a computer network (including a dedicated computer designed to operate over the network).

Of course, there are also several non-RAID storage architectures available today, including, for example, the Single Large Expensive Drive (SLED) which, as the name implies, comprises single drive, as well as disk arrays without any additional control—and thus accessed simply as independent drives—which are often referred to as the "Just a Bunch Of Disks" (JBOD) architecture. For the various implementations disclosed herein, the use of RAID or a RAID array can be easily substituted with one of the several non-RAID storage architectures, and thus references to RAID or a RAID array are merely exemplary and are in no way intended to be limiting.

FIG. 1 is an illustration of an exemplary networked computer environment 100 in which the numerous implementations disclosed herein may be utilized. The network environment 100 may include one or more clients 110 and 112 configured to communicate with each other or with one or more servers 121 and 122 through a network 120 which may be a variety of network types including the public switched telephone network (PSTN), a cellular telephone network, and a packet switched network (e.g., the Internet). A client, such as client 110, may comprise an external or removable storage device 182, or a client, such as client 112, may comprise an internal or non-removable storage device 184. A server, such as server 121, may also comprise a storage device 186 or a collection of storage devices. The network environment 100 may further comprise one or more NAS servers 140 and 144 configured to communicate with each other or with one or more clients 110 and 112 and/or one or more servers 121 and 122 through the network 120. An NAS server 140 and 144 may also comprise a storage device 192 and 194. The storage devices 182, 184, 186, 188, 192, and 194 may be a disk array (such as a RAID array), a SLED, a JBOD system, or any other storage system. In addition, the network environment 100 may also comprise one or more SANs 150, 152, and 154 that are operatively coupled to, for example, a server (such as SAN 186 coupled to server 121), an NAS server (such as the SAN 154 coupled to NAS server 144), or to a an NAS gateway 142 that together with its SAN 152 together provide the functionality of an NAS server. A server or an NAS server, such as NAS server 144, may comprise both a storage device 194 and a SAN 154.

While the clients 110 and 112, servers 121 and 122, NAS servers 140 and 144, and NAS gateway 142 are illustrated as being connected by the network 120, in some implementations it is contemplated that these systems may be directly connected to each other or even executed by the same computing system. Similarly, while the storage devices 182, 184, 186, 188, 192, and 194 are shown as connected to one of a client or a server, in some implementations it is contemplated that the storage devices 182, 184, 186, 188, 192, and 194 may be connected to each other or to more than one client and/or server, and that such connections may be made over the network 120 as well as directly. This is also true for the SANs 150, 152, and 154, although each SAN's own intra-network of storage devices are generally not directly accessible by regular devices.

In some implementations, the clients 110 and 112 may include a desktop personal computer, workstation, laptop, PDA, cell phone, smart phone, or any WAP-enabled device or any other computing device capable of interfacing directly or indirectly with the network 120. The clients 110 and 112 may run an HTTP client (e.g., a web-browsing program) or a WAP-enabled browser in the case of a cell phone, PDA or other wireless device, or the like, allowing a user of the clients 110 and 112 to access information available to it at the servers 121 and 122 or to provide information to the servers 121 and 122. Other applications may also be used by the clients 110 and 112 to access or provide information to the servers 121 and 122, for example. In some implementations, the servers 121 and 122 may be implemented using one or more general purpose computing systems.

FIG. 2A is a block diagram illustrating a typical storage system 200 exposing a plurality of volumes (or logical disks) 202, 204, and 206 managed by a volume manager (VM) 210 and backed by a disk array comprising, for example, a RAID controller 220 and its associated plurality of physical disks 232, 234, 236, and 238. Certain disk array implementations employ a technique known as data striping. Data striping is the technique of segmenting logically sequential data (such as a file) in a way that sequential segments are written to different physical storage devices. For example, a RAID-5 disk array uses block-level striping where each stripe is a concurrent series of blocks, one block for each disk in the array.

FIG. 2B is a block diagram of an exemplary RAID-5 physical disk array for which the numerous implementations disclosed herein may be applied. Referring to FIG. 2B, each letter (A, B, C, etc.) corresponds to a stripe and represents the group of blocks comprising each stripe (including a distributed parity block, discussed later herein). Striping is used to read and write data more quickly on I/O operations than is possible with a single physical storage device by performing read and write operations on multiple devices concurrently, thereby increasing throughput. In the example of FIG. 2B, three blocks (plus parity) corresponding to each letter can be written simultaneously.

Because different segments of data are kept on different physical disks in a striped disk array, the failure of one physical disk can result in the corruption of the full data sequence; consequently, the failure rate of the disk array is the sum of the failure rate of each storage device. However, this disadvantage of striping can be overcome by the storage of redundant information for the purpose of error correction, and parity is one approach for doing so.

Parity is data used to achieve redundancy such that, if a physical disk in the disk array fails, the remaining data on the other drives can be combined with the parity data to reconstruct the missing data. To calculate parity data for two physical drives, a Boolean XOR ("exclusive or") function is performed on the corresponding data bit-by-bit. Referring to FIG. 2B, for example, the parity of stripe A (Ap) is calculated as follows: Ap=A1 XOR A2 XOR A3. The resulting parity data is then stored on a separate physical drive from its inputs, and the parity information can be maintained on its own separate physical disk or, as shown in FIG. 2B, spread across all of the physical drives in the array (known as "distributed parity"). Then, should any of the three physical disks fail, the contents of the failed physical disk can be reconstructed by combining the data from the remaining physical drives with the parity data using the same XOR operation. For example, if "Disk 2" of FIG. 2B failed, A3 can be rebuilt using the XOR results of the contents of the two remaining disks, A1 ("Disk 0") and A2 ("Disk 1"), and the parity data Ap ("Disk 3") as follows: A3=A1 XOR A2 XOR Ap. This same approach can be used to reconstruct the other data on the failed drive (i.e., C2, D2, etc.) including any lost parity data (Bp, etc.).

A RAID-5 disk array, as illustrated in FIG. 2B, uses block-level striping (where a stripe is a concurrent series of blocks, one block for each disk in the array) with parity data distributed across all member disks. Data is also written to each physical disk one block at a time. However, whenever a block (or some portion thereof) is updated and needs to be written to the physical disk, the parity block (or some portion thereof) must also be recalculated and rewritten. Thus for example—and referring again to FIG. 2B—if a small portion of block A1 is to be rewritten (i.e., updated with new data in an I/O write), the entire block A1 must first be read (as an entire block) in order to update the block with the new information and perform a subsequent write (as an entire block). In addition, the corresponding parity block Ap must also be read (as an entire block) and, for each bit "flipped" (changed from a 0 to a 1 or vice versa) in the data block A1 due to the write operation, a corresponding bit in the parity block Ap must also be flipped before the parity block Ap can be rewritten to its physical disk. Consequently, each block-level write requires at least two reads and two writes to complete (although the reads can be conducted in parallel, as can the writes).

For certain storage system implementations, random writes may be prolific. For example, iSCSI-based storage servers are often utilized as backend storage for database servers. Since I/O requests from database servers to the disks are typically 8 KB in size, these storage servers would be receiving numerous random 8 KB I/O write requests. However, certain VMs may utilize I/O tracking granularity of 64 KB, these 8 KB I/Os may need to be converted to 64 KB with a read-modify-write sequence as well to sequence the 8 KB random I/Os, thereby resulting in the random write I/O issue described above.

Yet while the random write I/O issue is particularly costly for small write operations (i.e., operations involving a single block), larger sequential writes that span the entire width of the stripe (i.e., a "full-stripe write")—in the example of FIG. 2B, comprising three blocks at a time (e.g., A1, A2, and A3)—are much less costly because no read operations are required; instead, the new full-stripe write data (including the new calculated parity block) can simply be written over the entire stripe (as four concurrent write operations) without regard for the old data that is no longer needed for any purpose. Thus full-stripe writes are nearly as efficient as read operations that do not require parity data (except to correct for an error when detected).

Various implementations disclosed herein are directed to accelerating "random writes" (writes comprising less than a complete stripe of data) by consolidating several random writes together to create a "sequential write" (a full-stripe write) to eliminate one or more read operations and/or increase the volume of new/updated data stored for each write operation. Several such implementations comprise functionality in the VM (volume manager) for identifying random write I/O requests, queuing them locally in a journal, and then periodically flushing the journal to the disk array as a sequential write request. For data in the journal, the VM must track the journal, handle read/write I/O requests made to data cached in the journal, and periodically flush the journal to maintain adequate caching space for newer incoming random writes.

FIG. 3A is a block diagram of a journal comprising a journal table and journal data storage area, said journal representative of several implementations disclosed herein. In FIG. 3A, the journal table comprises a table of entries comprising entry values (Entry0, Entry1, . . . EntryN) and the logical block address (LBA) of each random block stored therein. For several implementations, the entry values correspond to a location in the journal data storage area. Moreover, for certain implementations, the size of the I/O data may be stored as a discrete type according to the size of the I/O data stored in the journal data storage area; for example, this I/O may range from 4 KB to 64 KB in some implementations. When directing a random write request to the journal, the VM records the data in the journal data storage area and marks an entry in the corresponding journal table. This journal table comprises the metadata for every journal item and includes the location of where that data is supposed reside in the logical disk expressed by the storage array. The journal data storage area can optionally be a portion of the disk array. In this implementation, random write requests, which are directed to various portions that are spread over the disk array, can be recorded in the journal data storage area. Then, a number of random write requests (i.e., a number of random write requests directed to the same stripe) can be consolidated to create a sequential, or full-stripe, write request.

For several implementations, the VM may have recent I/O pattern history for each volume so that, when an I/O write request for the volume is received, the VM is able to determine if the I/O write request is seemingly sequential or random by comparing the I/O write request to other recent I/Os to see if they together comprise substantially consecutive blocks indicative of sequential data. If the I/O write request seems unrelated to other recent I/O, however, then the VM will deem that I/O to be random and direct it to the journal.

In addition, the VM may take advantage of data from a caching module (such as an Advanced Caching Module, or ACM) layered between iSCSI module and the VM, in which case the VM consults the caching module to determine whether the I/O is random or sequential. For example, the caching module, using valid bitmap data maintained for each chunk in sector granularity, is aware of adjacent valid bits for incoming I/O and can check regions already valid in cache and, if not valid, then conclude that the incoming I/O is random.

Figure 3B:
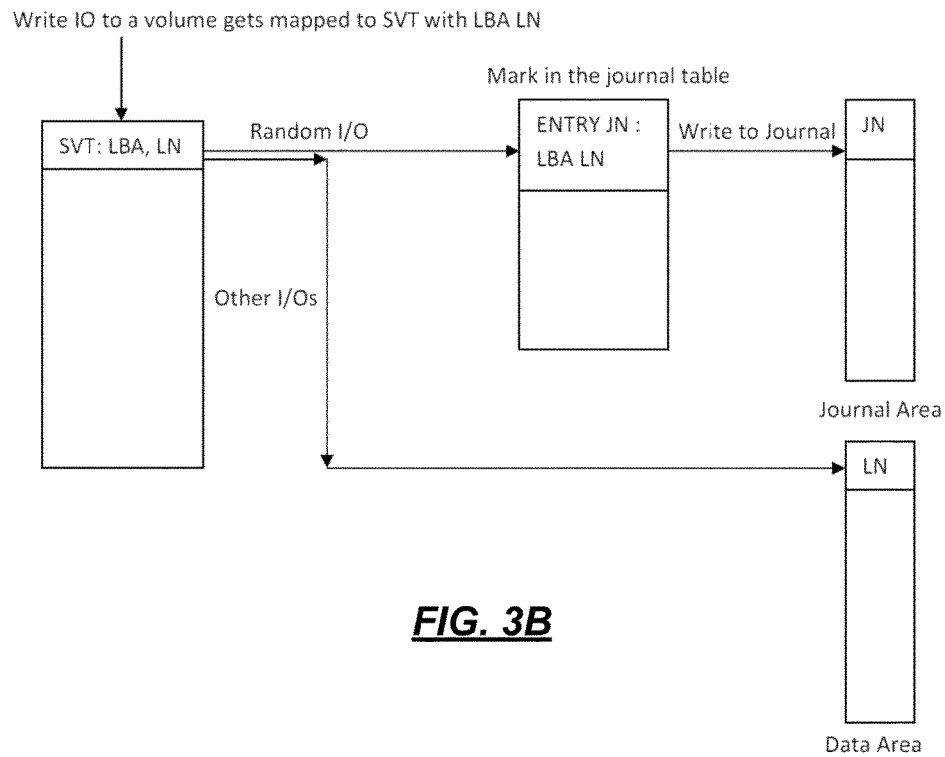
FIG. 3B is a block diagram of an I/O write request processing from a snapshot module of a VM (represented by a snapshot volume table, SVT) to either the journal of FIG. 3A or to the logical disk storage expressed by the underlying RAID array.

In certain VM implementations, the VM may comprise a snapshot functionality, and thus an I/O request might be passed to the journal function after being processed for a snapshot. FIG. 3B is a block diagram of an I/O write request processing from a snapshot module of a VM (represented by a snapshot volume table, SVT) to either the journal of FIG. 3A or to the logical disk storage expressed by the underlying RAID array. Conversely, FIG. 3C is a block diagram of an I/O read request processing from a snapshot module of a VM (represented by a snapshot volume table, SVT) from either the journal of FIG. 3A or to the logical disk storage expressed by the underlying RAID array.

Figure 4A:
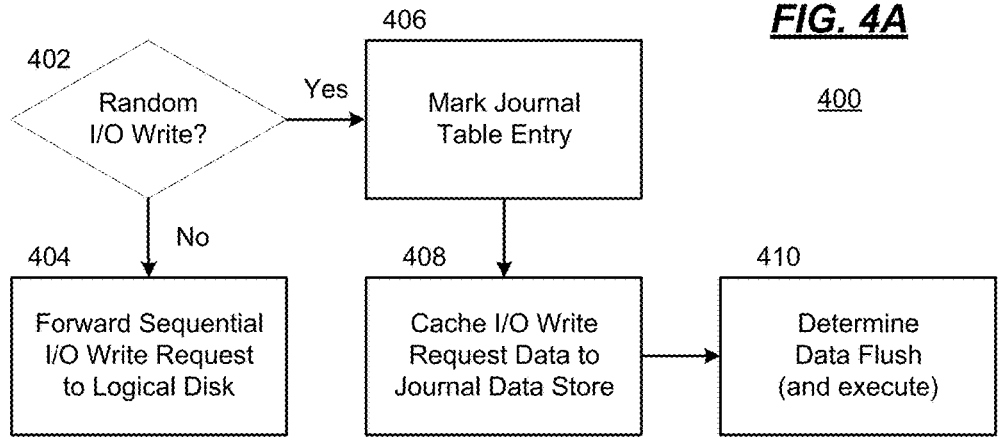
FIG. 4A is an operational flow diagram of I/O write request processing by the VM using the exemplary implementation of FIG. 3B.

FIG. 4A is an operational flow diagram 400 of I/O write request processing by the VM using the exemplary implementation of FIG. 3B. Referring to both FIGS. 4A and 3B, at 402 the VM (here, processing from the snapshot module's SVT) first determines if the I/O write request represents a sequential or random write operation. If sequential, then at 404 the I/O write request is immediately forwarded to the logical disk expressed by the exemplary RAID-5 disk array. If random, however, then at 406 the I/O write request is instead marked into the journal table and, at 408, the corresponding data is cached in the journal data store location corresponding to the entry location in the journal table. For certain implementations, at optional 410 the journal is then evaluated to determine if a flush of the data contained therein to the logical disk is necessary or desirable based on predefined criteria for the evaluation (and acts accordingly). For example, the journal can be periodically flushed to maintain adequate caching space for newer incoming random writes. Alternatively or additionally, the journal can be periodically flushed at a time to minimize impact on incoming I/O traffic (i.e., a time of lower I/O load on the disk array). In certain implementations, subsequent random I/O entries made to the journal are made adjacent to the one previously written, thus building a sequential I/O from the random I/Os.

Figure 3C:
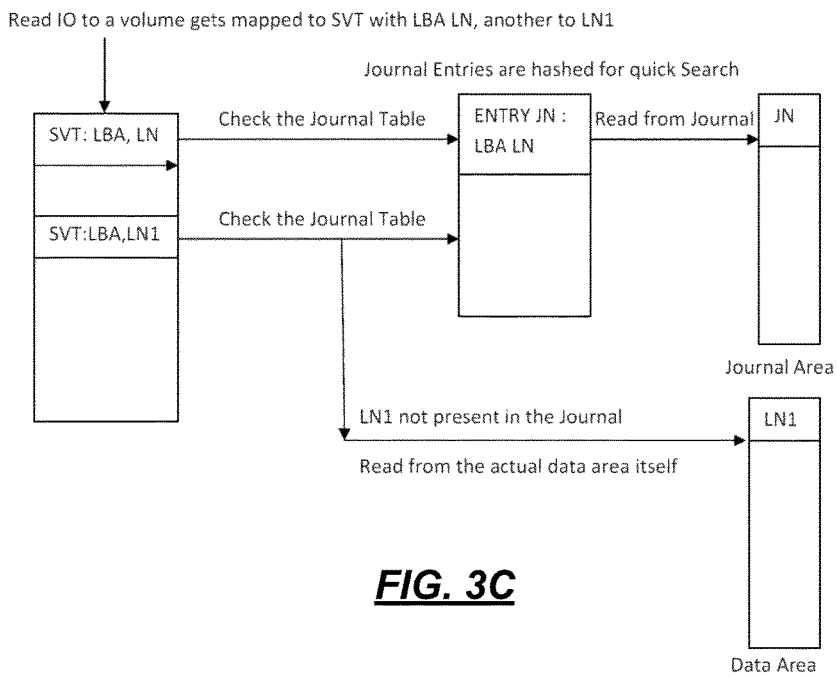
FIG. 3C is a block diagram of an I/O read request processing from a snapshot module of a VM (represented by a snapshot volume table, SVT) from either the journal of FIG. 3A or to the logical disk storage expressed by the underlying RAID array.
Figure 4B:
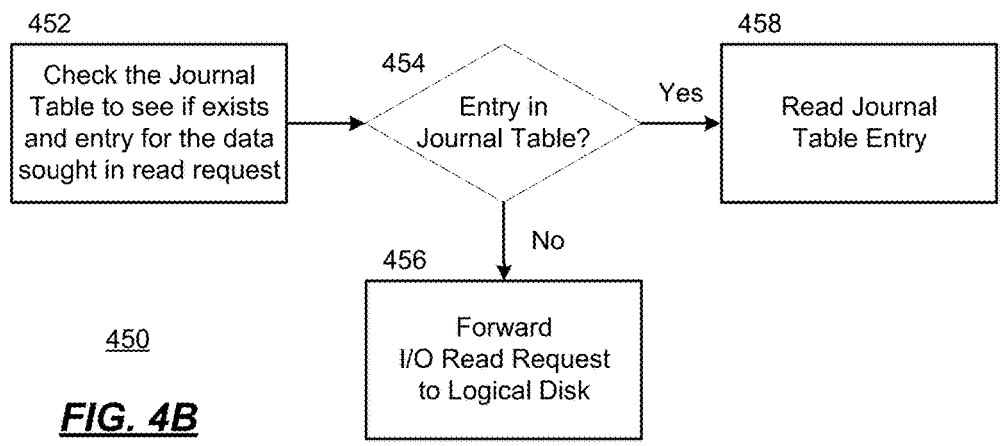
FIG. 4B is an operational flow diagram of I/O read request processing by the VM using the exemplary implementation of FIG. 3C.

FIG. 4B is an operational flow diagram 450 of I/O read request processing by the VM using the exemplary implementation of FIG. 3C. Referring to both FIGS. 4B and 3C, at 452 the VM (again, processing from the snapshot module's SVT) first checks the journal table to see if there is an entry for the data being sought and, at 454, thereby determines if the I/O read request is in the journal or on the logical disk. If on the logical disk, then at 456 the I/O read request is immediately forwarded to the logical disk expressed by the exemplary RAID-5 disk array. If in the journal, however, then at 458 the I/O read request is instead directed to the data cached in the journal data store location corresponding to the entry location in the journal table. For several implementations, each read request must first refer the journal if any part of the data being sought is in the journal area, and that part must be read from the journal. In some instance (i.e., for sub-block size elements), a corresponding read to the logical disk may also be necessary, and the journal entry used to update the block before returning in response to the I/O read request, if the return data is block-sized and comprises data not otherwise in the journal.

Figure 5A:
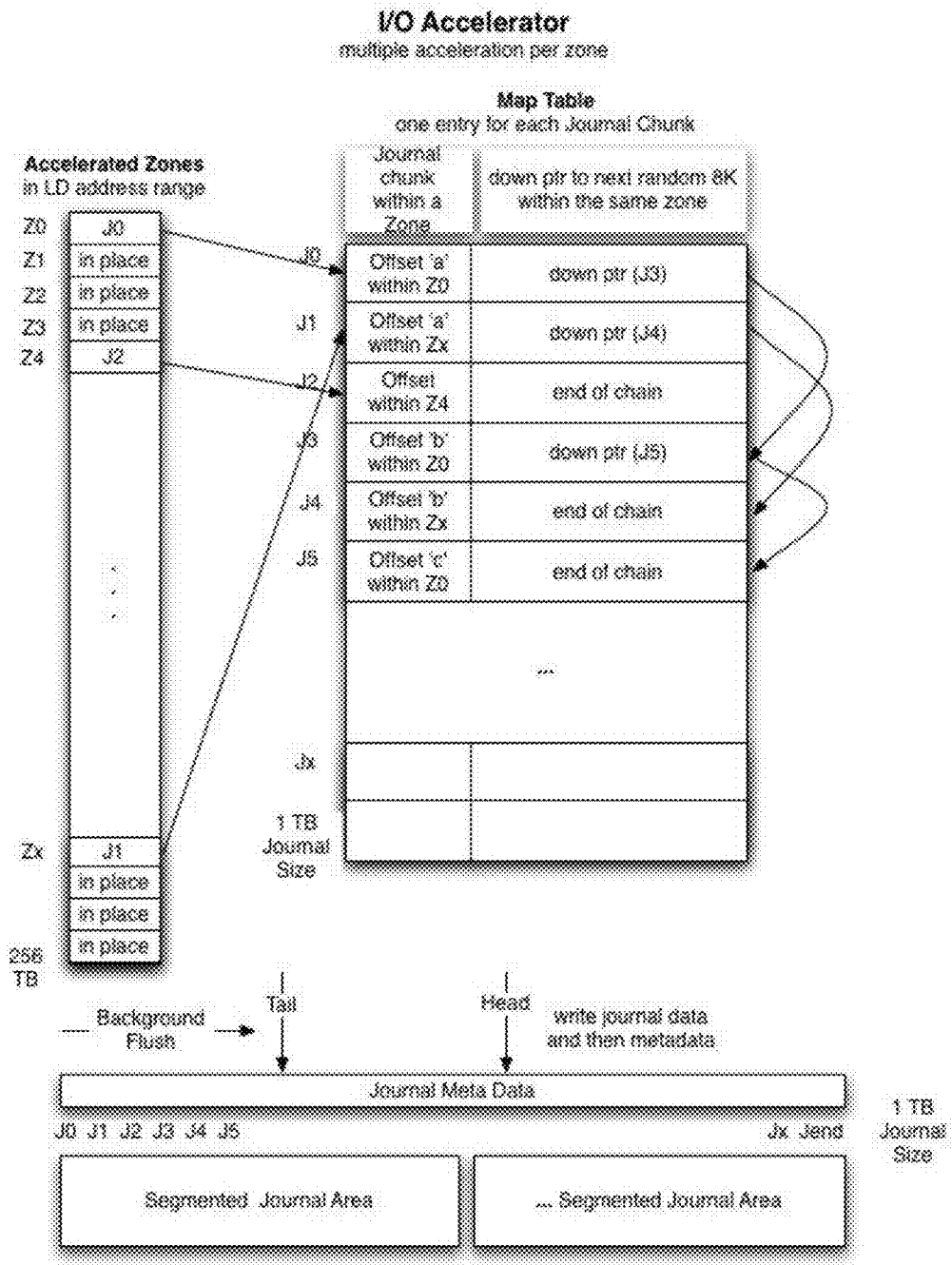
FIGS. 5A and 5B are block diagrams illustrating an exemplary embodiment of a hash-based search function suitable for certain implementations disclosed herein.
Figure 5B:
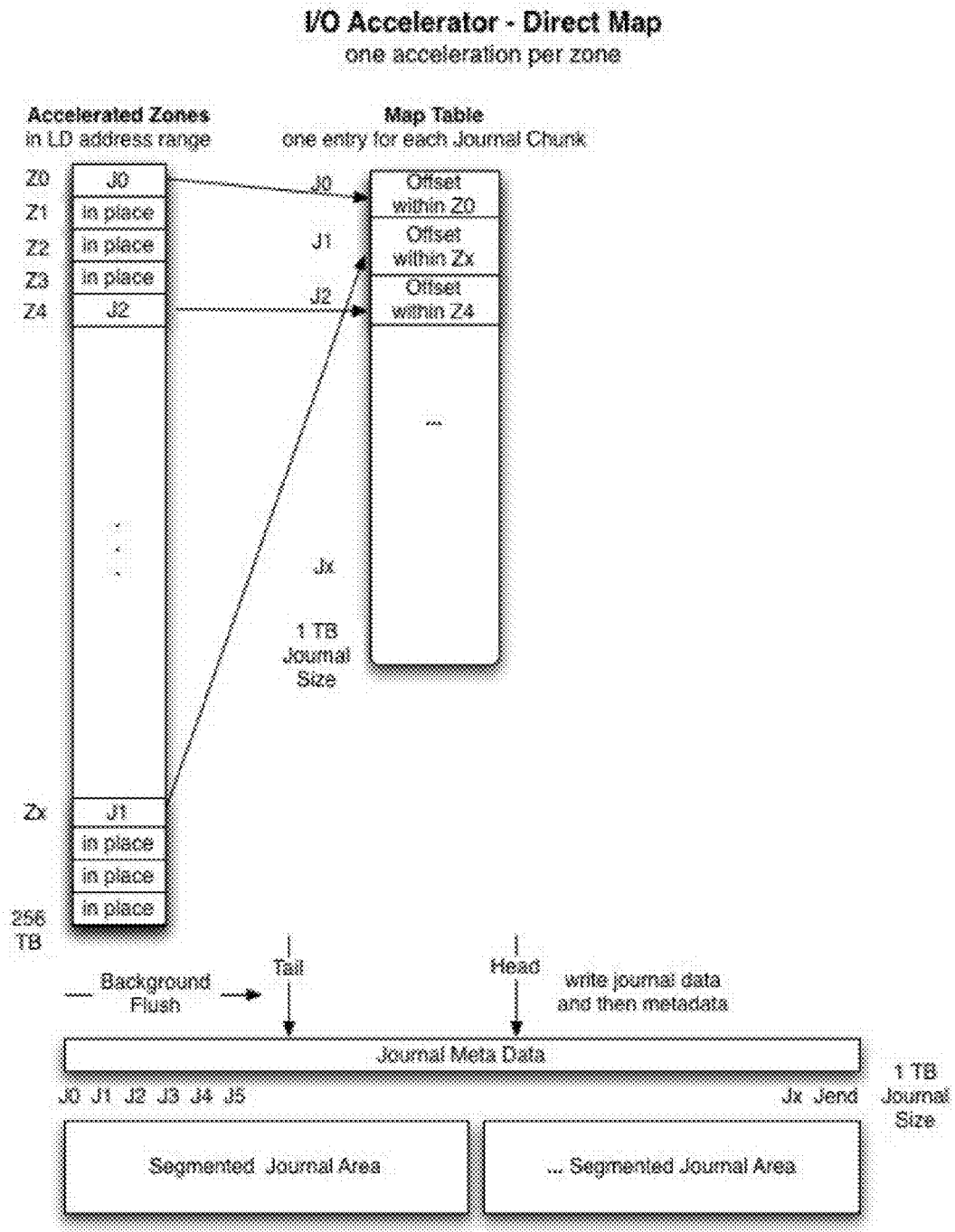

Since every read request has to search the journal table to determine whether the data is in the journal or on the logical disk, a linear search could be very expensive, especially when the journal table is very long. To speed searching, therefore, certain implementations may use a hash-based search function to speed the search. FIGS. 5A and 5B are block diagrams illustrating an exemplary embodiment of just such a hash-based search function characterized by the following text (italicized):

> Since the requests in question are random, an assumption can be made that there would be very few random requests per VM territory (or zone) $Z_0 \ldots Z_x$ during a single journal lifetime. On this assumption, if there are no journalled I/Os $J_0 \ldots J_x$ in a VM territory, the corresponding VM SVT segment would point directly to just a physical territory. If there are journalled I/Os $J_0 \ldots J_x$, on the other hand, the SVT segment would point to another structure that would in addition to holding the physical territory would also hold the journal location of journalled LBAs within the territory. This would support multiple accelerations within the territory zone. For such an approach, a linked list can be built to hold the journalled I/Os $J_0 \ldots J_x$ within the zone, or a linear array of such I/O's within the zone can also be maintained. Approaches for supporting both (a) multiple accelerations per zone and (b) a single acceleration per zone are illustrated in the figures. In either case, when the journal is clean, the decision about the zone size may be dynamic and computed based on how many random I/Os have hit on a particular zone in the past. Similarly, the Accelerated Zone size may be decided when the Journal is clean and computed based on Logical Disk address range such that greater LD address ranges correspond to larger zone size (and vice versa).

Figure 6A:
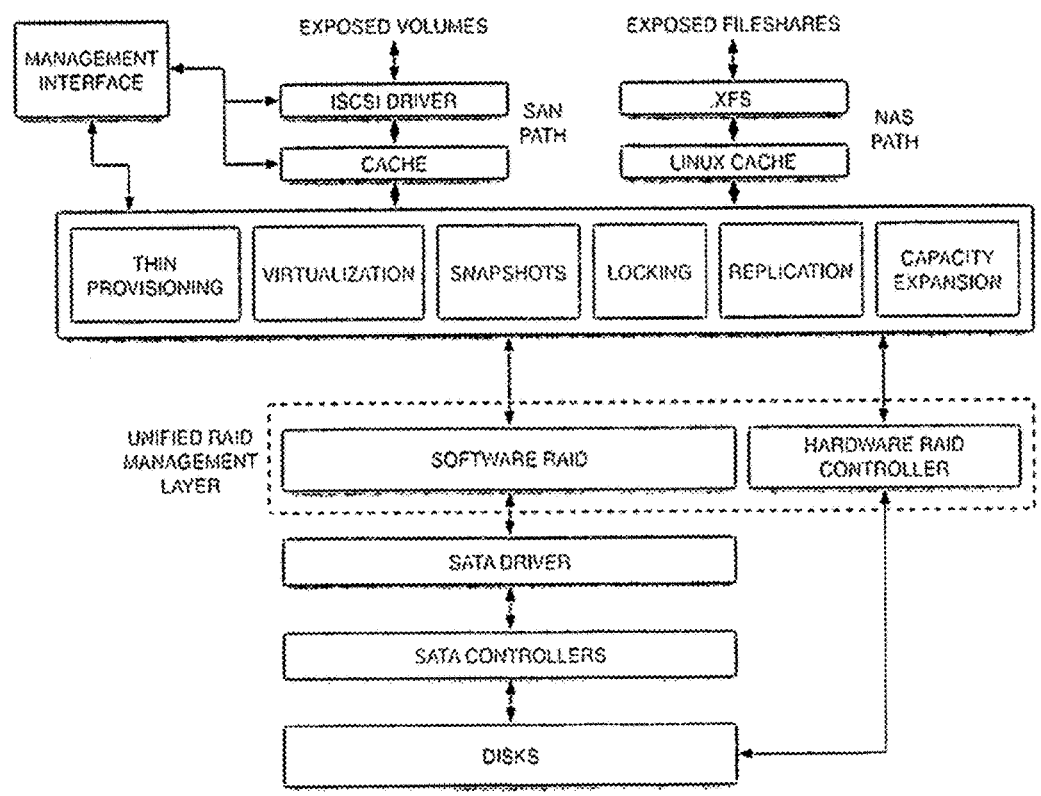
FIG. 6A is a block diagram illustrating an exemplary storage system on which various implementations disclosed herein may execute.

FIG. 6A is a block diagram illustrating an exemplary storage system on which various implementations disclosed herein may execute. As illustrated in this figure, a volume may be either a data volume (in the case of iSCSI I/O requests) or a fileshare (in the case of the XFS I/O requests). SAN paths and NAS paths are thus shown, as well as additional functionality that may exist in a RAID controller. Also shown is a view of the VM coupled to the RAID controller as well as the iSCSI driver and cache (and possibly the XFS file system driver and cache). At the top of the stack, storage volumes or fileshares are exposed to the clients, and at the bottom of the storage stack are the physical disks that are utilized to store the data. The physical disks are, in turn, connected to a disk controller, such as a Serial ATA (SATA) controller or a hardware RAID controller. In the case of a SATA controller, a SATA driver may be utilized to access the hardware device, and a software RAID module may be utilized to provide RAID services in the absence of a hardware RAID controller. A unified RAID management layer may be utilized to simplify the utilization of RAID with either software or hardware implementations.

Above the RAID management layer sits a combination device driver that implements additional functions as extensions to the VM. Above this combination device driver a number of software components are utilized depending upon the access mechanism employed to access the data stored on the physical disks. In particular, a SAN path is provided that utilizes a cache and an iSCSI driver, and a NAS path is also provided that utilizes a cache and the XFS high-performance journaling files system, for example. As such, volumes are exposed through the SAN path while fileshares are exposed through the NAS path, although both constitute "volumes" with regard to disclosures herein pertaining to the various implementations.

Figure 6B:
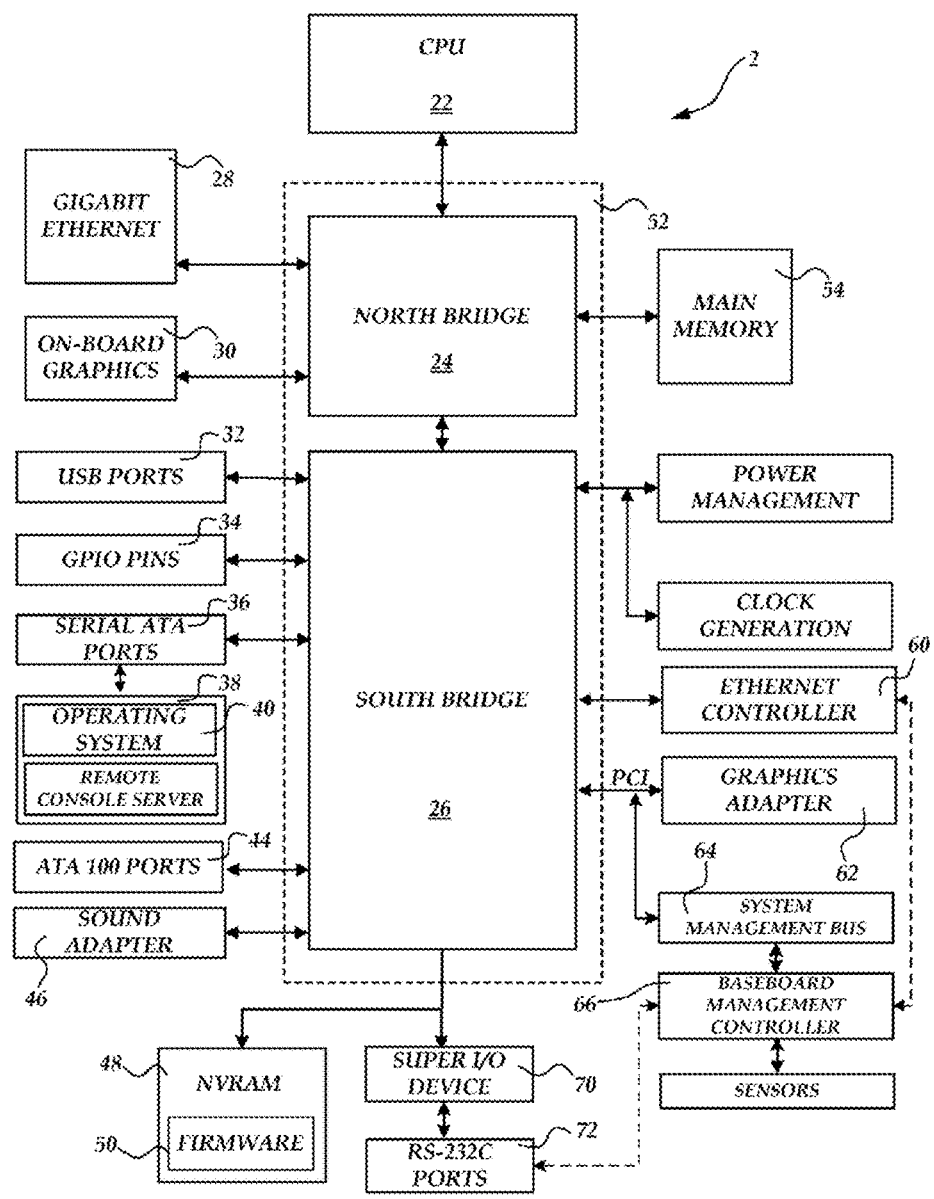
FIG. 6B shows an exemplary storage node computer environment (e.g., a computer server and/or NAS server) in which example implementations and aspects may be implemented.

FIG. 6B shows an exemplary storage node computer environment (e.g., a computer server and/or NAS server) in which example implementations and aspects may be implemented. Referring to FIG. 6B, the storage node computer 2 includes a baseboard, or "motherboard", which is a printed circuit board to which a multitude of components or devices may be connected by way of a system bus or other electrical communication paths. In one illustrative embodiment, a CPU 22 operates in conjunction with a chipset 52. The CPU 22 is a standard central processor that performs arithmetic and logical operations necessary for the operation of the computer. The storage node computer 2 may include a multitude of CPUs 22.

The chipset 52 includes a north bridge 24 and a south bridge 26. The north bridge 24 provides an interface between the CPU 22 and the remainder of the computer 2. The north bridge 24 also provides an interface to a random access memory ("RAM") used as the main memory 54 in the computer 2 and, possibly, to an on-board graphics adapter 30. The north bridge 24 may also include functionality for providing networking functionality through a gigabit Ethernet adapter 28. The gigabit Ethernet adapter 28 is capable of connecting the computer 2 to another computer via a network. Connections which may be made by the network adapter 28 may include LAN or WAN connections. LAN and WAN networking environments are commonplace in offices, enterprise-wide computer networks, intranets, and the internet. The north bridge 24 is connected to the south bridge 26.

The south bridge 26 is responsible for controlling many of the input/output functions of the computer 2. In particular, the south bridge 26 may provide one or more universal serial bus ("USB") ports 32, a sound adapter 46, an Ethernet controller 60, and one or more general purpose input/output ("GPIO") pins 34. The south bridge 26 may also provide a bus for interfacing peripheral card devices such as a graphics adapter 62. In one embodiment, the bus comprises a peripheral component interconnect ("PCI") bus. The south bridge 26 may also provide a system management bus 64 for use in managing the various components of the computer 2. Additional details regarding the operation of the system management bus 64 and its connected components are provided below.

The south bridge 26 is also operative to provide one or more interfaces for connecting mass storage devices to the computer 2. For instance, according to an embodiment, the south bridge 26 includes a serial advanced technology attachment ("SATA") adapter for providing one or more serial ATA ports 36 and an ATA 100 adapter for providing one or more ATA 100 ports 44. The serial ATA ports 36 and the ATA 100 ports 44 may be, in turn, connected to one or more mass storage devices storing an operating system 40 and application programs, such as the SATA disk drive 38. As known to those skilled in the art, an operating system 40 comprises a set of programs that control operations of a computer and allocation of resources. An application program is software that runs on top of the operating system software, or other runtime environment, and uses computer resources to perform application specific tasks desired by the user.

According to one embodiment of the invention, the operating system 40 comprises the LINUX operating system. According to another embodiment of the invention the operating system 40 comprises the WINDOWS SERVER operating system from MICROSOFT CORPORATION. According to another embodiment, the operating system 40 comprises the UNIX or SOLARIS operating system. It should be appreciated that other operating systems may also be utilized.

The mass storage devices connected to the south bridge 26, and their associated computer-readable media, provide non-volatile storage for the computer 2. Although the description of computer-readable media contained herein refers to a mass storage device, such as a hard disk or CD-ROM drive, it should be appreciated by those skilled in the art that computer-readable media can be any available media that can be accessed by the computer 2. By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, HD-DVD, BLU-RAY, or other optical storage, magnetic cassettes, magnetic tape, magnetic disk storage or other magnetic storage devices, or any other medium which can be used to store the desired information and which can be accessed by the computer.

A low pin count ("LPC") interface may also be provided by the south bridge 26 for connecting a "Super I/O" device 70. The Super I/O device 70 is responsible for providing a number of input/output ports, including a keyboard port, a mouse port, a serial interface 72, a parallel port, and other types of input/output ports. The LPC interface may also connect a computer storage media such as a ROM or a flash memory such as a NVRAM 48 for storing the firmware 50 that includes program code containing the basic routines that help to start up the computer 2 and to transfer information between elements within the computer 2.

As described briefly above, the south bridge 26 may include a system management bus 64. The system management bus 64 may include a BMC 66. In general, the BMC 66 is a microcontroller that monitors operation of the computer system 2. In a more specific embodiment, the BMC 66 monitors health-related aspects associated with the computer system 2, such as, but not limited to, the temperature of one or more components of the computer system 2, speed of rotational components (e.g., spindle motor, CPU Fan, etc.) within the system, the voltage across or applied to one or more components within the system 2, and the available or used capacity of memory devices within the system 2. To accomplish these monitoring functions, the BMC 66 is communicatively connected to one or more components by way of the management bus 64. In an embodiment, these components include sensor devices for measuring various operating and performance-related parameters within the computer system 2. The sensor devices may be either hardware or software based components configured or programmed to measure or detect one or more of the various operating and performance-related parameters. The BMC 66 functions as the master on the management bus 64 in most circumstances, but may also function as either a master or a slave in other circumstances. Each of the various components communicatively connected to the BMC 66 by way of the management bus 64 is addressed using a slave address. The management bus 64 is used by the BMC 66 to request and/or receive various operating and performance-related parameters from one or more components, which are also communicatively connected to the management bus 64.

It should be appreciated that the computer 2 may comprise other types of computing devices, including hand-held computers, embedded computer systems, personal digital assistants, and other types of computing devices known to those skilled in the art. It is also contemplated that the computer 2 may not include all of the components shown in FIG. 6B, may include other components that are not explicitly shown in FIG. 6B, or may utilize an architecture completely different than that shown in FIG. 6B.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A non-transitory computer-readable medium having computer-executable instructions stored thereon for accelerating I/O performance for a striped-disk array that, when executed by a storage computer, cause the storage computer to:
   receive a write I/O request directed to a portion of a stripe of the striped-disk array;
   determine, prior to any forwarding of the received write I/O request to the striped-disk array, whether the write I/O request is random or sequential by comparing the write I/O request to a plurality of recent I/O requests;
   in response to determining that the write I/O request is random, record the random write I/O request in a journal data storage area of the striped-disk array; and
   periodically flush the journal data storage area by forming a sequential write I/O that spans a width of a stripe of the striped-disk array, the formed sequential write I/O comprising the random write I/O request and at least one other random write I/O request that is recorded in the journal data storage area.

2. The non-transitory computer-readable medium of claim 1, having further computer-executable instructions stored thereon that, when executed by the storage computer, cause the storage computer to forward the sequential write I/O request to the striped-disk array in response to determining that the write I/O request is sequential.

3. The non-transitory computer-readable medium of claim 1, having further computer-executable instructions stored thereon that, when executed by the storage computer, cause the storage computer to:
   forward the formed sequential write I/O to the striped-disk array.

4. The non-transitory computer-readable medium of claim 3, wherein the journal data storage area is periodically flushed in order to maintain a predetermined amount of storage capacity in the journal data storage area to accommodate incoming write I/O requests.

5. The non-transitory computer-readable medium of claim 3, wherein the journal data storage area is periodically flushed at a time that minimizes impact on incoming I/O requests.

6. The non-transitory computer-readable medium of claim 1, having further computer-executable instructions stored thereon that, when executed by the storage computer, cause the storage computer to:
   maintain a journal table including a plurality of entries; and
   in response to determining that the write I/O request is random, update an entry in the journal table corresponding to the random write I/O operation to indicate a location in the journal data storage area and the portion of the stripe of the striped-disk array to which the random write I/O request is directed.

7. The non-transitory computer-readable medium of claim 6, having further computer-executable instructions stored thereon that, when executed by the storage computer, cause the storage computer to:
   receive a read I/O request;
   determine whether the journal table includes an entry corresponding to the read I/O request;
   upon determining that the journal table includes an entry corresponding to the read I/O request, service at least a portion of the read I/O request from the journal data storage area; and
   upon determining that the journal table does not include an entry corresponding to the read I/O request, forward the read I/O request to the striped-disk array.

8. The non-transitory computer-readable medium of claim 7, having further computer-executable instructions stored thereon that, when executed by the storage computer, cause the storage computer to:
  partition a storage capacity of the striped-disk array into zones;
  maintain an accelerated zone table comprising entries that relate the zones to corresponding entries in the journal table;
  determine a zone of the striped-disk array to which the read I/O request is directed; and
  determine whether the journal table includes an entry corresponding to the read I/O request by searching the accelerated zone table based on the zone of the striped-disk array to which the read I/O request is directed.

9. A method for accelerating I/O performance for a striped-disk array, comprising:
  receiving a write I/O request directed to a portion of a stripe of the striped-disk array;
  determining, prior to any forwarding of the received write I/O request to the striped-disk array, whether the write I/O request is random or sequential by comparing the write I/O request to a plurality of recent I/O requests;
  in response to determining that the write I/O request is random, recording the random write I/O request in a journal data storage area of the striped-disk array; and
  periodically flushing the journal data storage area by forming a sequential write I/O that spans a width of a stripe of the striped-disk array, the formed sequential write I/O comprising the random write I/O request and at least one other random write I/O request that is recorded in the journal data storage area.

10. The method of claim 9 further comprising forwarding the sequential write I/O request to the striped-disk array in response to determining that the write I/O request is sequential.

11. The method of claim 9 further comprising:
  forwarding the formed sequential write I/O to the striped-disk array.

12. The method of claim 11, wherein the journal data storage area is periodically flushed in order to maintain a predetermined amount of storage capacity in the journal data storage area to accommodate incoming write I/O requests.

13. The method of claim 11, wherein the journal data storage area is periodically flushed at a time that minimizes impact on incoming I/O requests.

14. The method of claim 9, further comprising:
  maintaining a journal table including a plurality of entries; and
  in response to determining that the write I/O request is random, updating an entry in the journal table corresponding to the random write I/O operation to indicate a location in the journal data storage area and the portion of the stripe of the striped-disk array to which the random write I/O request is directed.

15. The method of claim 14, further comprising:
  receiving a read I/O request;
  determining whether the journal table includes an entry corresponding to the read I/O request;
  upon determining that the journal table includes an entry corresponding to the read I/O request, servicing at least a portion of the read I/O request from the journal data storage area; and
  upon determining that the journal table does not include an entry corresponding to the read I/O request, forwarding the read I/O request to the striped-disk array.

16. The method of claim 15, further comprising:
  partitioning a storage capacity of the striped-disk array into zones;
  maintaining an accelerated zone table comprising entries that relate the zones to corresponding entries in the journal table;
  determining a zone of the striped-disk array to which the read I/O request is directed; and
  determining whether the journal table includes an entry corresponding to the read I/O request further comprises searching the accelerated zone table based on the zone of the striped-disk array to which the read I/O request is directed.

17. A storage computer for accelerating I/O performance for a striped-disk array, comprising:
  a processing unit; and
  a memory communicatively connected to the processing unit that stores computer-executable instructions that, when executed by the processing unit, cause the storage computer to:
    receive a write I/O request directed to a portion of a stripe of the striped-disk array;
    determine, prior to any forwarding of the received write I/O request to the striped-disk array, whether the write I/O request is random or sequential by comparing the write I/O request to a plurality of recent I/O requests;
    in response to determining that the write I/O request is random, record the random write I/O request in a journal data storage area of the striped-disk array; and
    periodically flush the journal data storage area by forming a sequential write I/O that spans a width of a stripe of the striped-disk array, the formed sequential write I/O comprising the random write I/O request and at least one other random write I/O request that is recorded in the journal data storage area.

18. The storage computer of claim 17, wherein the memory stores further computer-executable instructions that, when executed by the processing unit, cause the storage computer to:
  forward the formed sequential write I/O to the striped-disk array.

19. The storage computer of claim 17, wherein the memory stores further computer-executable instructions that, when executed by the processing unit, cause the storage computer to:
  maintain a journal table including a plurality of entries; and
  update an entry in the journal table corresponding to the random write I/O operation to indicate a location in the journal data storage area and the portion of the stripe of the striped-disk array to which the random write I/O request is directed.

20. The storage computer of claim 19, wherein the memory stores further computer-executable instructions that, when executed by the processing unit, cause the storage computer to:
  receive a read I/O request;
  determine whether the journal table includes an entry corresponding to the read I/O request;
  upon determining that the journal table includes an entry corresponding to the read I/O request, service at least a portion of the read I/O request from the journal data storage area; and upon determining that the journal table does not include an entry corresponding to the read I/O request, forward the read I/O request to the striped-disk array.

* * * * *